United States Patent
Fukunaga et al.

(10) Patent No.: US 8,415,439 B2
(45) Date of Patent: Apr. 9, 2013

(54) ETHYLENE-TETRAFLUOROETHYLENE COPOLYMER

(75) Inventors: Shintaro Fukunaga, Chiyoda-ku (JP); Atsushi Funaki, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 105 days.

(21) Appl. No.: 12/758,855

(22) Filed: Apr. 13, 2010

(65) Prior Publication Data

US 2010/0204423 A1    Aug. 12, 2010

Related U.S. Application Data

(63) Continuation of application No. PCT/JP2009/051627, filed on Jan. 30, 2009.

(30) Foreign Application Priority Data

Feb. 1, 2008   (JP) ................................. 2008-022971
Dec. 18, 2008  (JP) ................................. 2008-322588

(51) Int. Cl.
  *C08F 16/24*  (2006.01)
(52) U.S. Cl.
  USPC .......... 526/247; 526/250; 526/255; 526/348; 568/685; 570/126; 570/136
(58) Field of Classification Search .................. 526/247, 526/250, 255; 570/126, 136; 568/685
See application file for complete search history.

(56) References Cited

U.S. PATENT DOCUMENTS

| 4,123,602 | A | * | 10/1978 | Ukihashi et al. ............. 522/187 |
| 5,214,115 | A | | 5/1993 | Langstein et al. |
| 6,753,393 | B2 | * | 6/2004 | Funaki et al. ................. 526/250 |
| 2007/0100101 | A1 | | 5/2007 | Hung et al. |

FOREIGN PATENT DOCUMENTS

| EP | 0 928 796 A1 | 7/1999 |
| EP | 2 090 595 A1 | 8/2009 |
| JP | 06-136218 | 5/1994 |
| JP | 2000-140067 | 5/2000 |
| JP | 2002-012626 | 1/2002 |
| JP | 2005-29704 | 2/2005 |

OTHER PUBLICATIONS

Machine translation of JP 2002-012626 A, translated on Dec. 21, 2010.*

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

The present invention provides an ETFE-type copolymer having a high melt tension and excellent blow moldability. An ethylene-tetrafluoroethylene copolymer which comprises ethylene units, tetrafluoroethylene units and units of a monomer (A) having at least two copolymerizable double bonds and which has a ratio (X/W) of its melt tension (XmN) to a load (Wkg) applied for the measurement of the melt tension being at least 0.8.

18 Claims, No Drawings

ETHYLENE-TETRAFLUOROETHYLENE COPOLYMER

TECHNICAL FIELD

The present invention relates to an ethylene-tetrafluoroethylene copolymer. More particularly, it relates to an ethylene-tetrafluoroethylene copolymer excellent in blow moldability and inflation moldability.

BACKGROUND ART

A thermoplastic fluororesin such as a tetrafluoroethylene-hexafluoropropylene copolymer or an ethylene-tetrafluoroethylene copolymer, is excellent in thermal resistance, chemical resistance, weather resistance, etc., and thus is widely used as a material for tubes, pipes, coatings, wire-coverings, films, horticultural covering films, etc.

However, the thermoplastic fluororesin has had a problem such that during the blow molding, when a cylindrically shaped resin (hereinafter referred to as a parison) in a softened state in the mold is pulled downward by its own weight, an upper portion of the parison stretches so that the wall thickness of that portion becomes thin, and the wall thickness of the molded product becomes non-uniform. Such reduction of the wall thickness becomes distinct especially in blow molding a large sized product. Further, in inflation molding, the thickness of a film to be formed was likely to be non-uniform.

In order to prevent non-uniformity in the wall thickness of a parison or to make the thickness of the film to be uniform, it is effective to increase the melt tension of the thermoplastic fluororesin. If the molecular weight of the thermoplastic fluororesin is increased, the melt tension can be made high. However, the melt viscosity of the thermoplastic fluororesin at the time of molding becomes high, whereby there has been a problem such that the moldability of the thermoplastic fluororesin at the time of extruding a parison tends to be low, and the productivity tends to be low.

A polyethylene is known to have a high melt tension and a low melt viscosity when it has a long chain branched structure. Patent Document 1 reports that a copolymer of tetrafluoroethylene with a fluorinated monomer having at least two double bonds, is excellent in blow moldability, but discloses nothing about an ethylene-tetrafluoroethylene copolymer.

Patent Document 1: JP-A-2002-12626

DISCLOSURE OF THE INVENTION

Object to be Accomplished by the Invention

It is an object of the present invention to provide an ethylene-tetrafluoroethylene copolymer which has a high melt tension and which is excellent in blow moldability and inflation moldability.

Means to Accomplish the Object

The present inventors have conducted an extensive research to accomplish the above object and as a result, have found an ethylene-tetrafluoroethylene copolymer which accomplishes the object. The present invention is based on such a discovery and provides the following.

(1) An ethylene-tetrafluoroethylene copolymer which comprises ethylene units, tetrafluoroethylene units and units of a monomer (A) having at least two copolymerizable double bonds and which has a ratio (X/W) of its melt tension (XmN) to a load (Wkg) applied for the measurement of the melt tension being at least 0.8.

(2) The ethylene-tetrafluoroethylene copolymer according to the above (1), wherein the proportion of the tetrafluoroethylene units is from 30 to 70 mol % and the proportion of the ethylene units is from 70 to 30 mol %, based on the total of the tetrafluoroethylene units and the ethylene units.

(3) The ethylene-tetrafluoroethylene copolymer according to the above (1) or (2), wherein the monomer (A) is a monomer having two copolymerizable double bonds.

(4) The ethylene-tetrafluoroethylene copolymer according to any one of the above (1) to (3), which further contains units of a monomer (B) having one copolymerizable double bond.

(5) The ethylene-tetrafluoroethylene copolymer according to the above (4), wherein the monomer (B) is $CH_2=CH-C_nF_{2n+1}$ wherein n is an integer of from 4 to 8.

(6) The ethylene-tetrafluoroethylene copolymer according to the above (4) or (5), wherein the proportion of units of the monomer (B) is from more than 0 mol % to 10 mol %, based on the total of the tetrafluoroethylene units and the ethylene units.

(7) The ethylene-tetrafluoroethylene copolymer according to any one of the above (1) to (6), wherein the monomer (A) is a monomer represented by the following formula:

wherein $R^f$ is a polyfluoroalkylene group, and each of Y and Z which are independent of each other, is a vinyl group, a trifluorovinyl group or a trifluorovinyloxy group.

(8) The ethylene-tetrafluoroethylene copolymer according to any one of the above (1) to (6), wherein the monomer (A) is a monomer represented by the following formula:

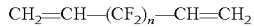

wherein n is an integer of from 4 to 8.

(9) The ethylene-tetrafluoroethylene copolymer according to any one of the above (1) to (8), wherein the ratio (X/W) is from 0.8 to 5.

Advantageous Effects of the Invention

According to the present invention, it is possible to obtain an ethylene-tetrafluoroethylene copolymer which has a high melt tension and which is excellent in blow moldability and inflation moldability.

BEST MODE FOR CARRYING OUT THE INVENTION

Now, the present invention will be described with reference to an embodiment, but it should be understood that the present invention is by no means restricted to the following embodiment.

[Ethylene-Tetrafluoroethylene Copolymer]

An ethylene-tetrafluoroethylene copolymer according to the embodiment of the present invention comprises ethylene units, tetrafluoroethylene units and units of a monomer (A) having at least two copolymerizable double bonds and has a ratio (X/W) of its melt tension (XmN) to a load (Wkg) applied for the measurement of the melt tension being at least 0.8. Such an ethylene-tetrafluoroethylene copolymer according to the embodiment of the present invention may further contain units of a monomer (B) having one copolymerizable double bond for the purpose of e.g. improving the stress crack resistance.

The proportions of the respective monomer units in the fluoropolymer do not necessarily agree to the employed proportions or charged proportions of the respective monomers used for the production of such a polymer. The polymerization reactivities of the respective monomers vary, and therefore, a monomer having a low polymerization reactivity is used usually in a proportion larger than the desired proportion of units of such a monomer in the obtainable polymer. The excess amount will remain as an unreacted monomer.

In the present invention, the proportions of monomer units derived from ethylene (hereinafter referred to also as "E"), tetrafluoroethylene (hereinafter referred to also as "TFE"), the monomer (A) and the monomer (B) represent the proportions of the monomer units calculated by measuring the obtained ethylene-tetrafluoroethylene copolymer (hereinafter referred to also as "ETFE copolymer").

In the ETFE copolymer of the present invention, the proportion of TFE units is preferably from 30 to 70 mol %, more preferably from 40 to 60 mol %, and the proportion of E units is preferably from 70 to 30 mol %, more preferably from 60 to 40 mol %, based on the total of TFE units and E units in the fluoropolymer.

[Monomer (A)]

The monomer (A) is preferably a monomer having two copolymerizable double bonds. The monomer having two copolymerizable double bonds may, for example, be a monomer represented by Y—$R^f$—Z wherein $R^f$ is a polyfluoroalkylene group, and each of Y and Z which are independent of each other, is a vinyl group, a trifluorovinyl group or a trifluorovinyloxy group. Each of Y and Z is preferably a vinyl group or a trifluorovinyloxy group, since the copolymerizability is thereby good. Further, Y and Z are preferably the same in view of the availability. It is further preferred that Y and Z are the same, and they are vinyl groups or trifluorovinyl groups.

Specifically, it may be $CH_2$=CH—$R^{f1}$—CH=$CH_2$, $CF_2$=CF—$R^{f1}$—CH=$CH_2$, $CF_2$=CF—$R^{f1}$—CF=$CF_2$, $CF_2$=CF—O—$R^{f1}$—CH=$CH_2$, $CF_2$=CF—O—$R^{f1}$—CF=$CF_2$, wherein $R^{f1}$ is a single bond or a $C_{1-8}$ fluoroalkyl group, or $CF_2$=CF—O—$R^{f2}$—O—CF=$CF_2$, wherein $R^{f2}$ is a $C_{1-8}$ fluoroalkyl group. From such a viewpoint that the physical properties of the obtained polymer are good, $R^f$ is preferably a perfluoroalkylene group, more preferably a $C_{2-8}$ perfluoroalkylene group, further preferably a $C_4$ or $C_6$ perfluoroalkylene group from the viewpoint of availability.

The monomer (A) is preferably $CH_2$=CH—$(CF_2)_n$—CH=$CH_2$ wherein n is an integer of from 4 to 8, or $CF_2$=CF—O—$(CF_2)_n$—CF=$CF_2$, from the viewpoint of availability. Among them, $CH_2$=CH—$(CF_2)_n$—CH=$CH_2$ wherein n is 4 or 6 (hereinafter referred to also as "monomer (A1)") is most preferred.

In a case where the copolymerizable double bond is a vinyl group like in the case of the monomer (A1), from its polymerizability, the possibility that a TFE unit will be adjacent is high, and the probability that the E unit will be adjacent, is low. Accordingly, the possibility that hydrocarbon chains will be connected to one another is low, and the structure will be thermally stable.

The proportion of units of the monomer (A) based on the total monomer units in the ETFE copolymer of the present invention is so small that there may be a case where the measurement is difficult by a currently available analytical technique. If the monomer (A) is present in an amount of at least 0.3 mol % based on the total amount of E and TFE, the analysis is considered to be possible. Since it is difficult to measure the monomer units derived from the monomer (A), the amount of the monomer (A) to be charged for the polymerization is adjusted, while observing the physical properties of the obtainable ETFE copolymer. The amount to be charged for the polymerization varies to some extent by the monomer reactivity ratio of the monomer (A) to be used. However, in order to sufficiently improve the melt tension without substantially changing the properties of the obtainable ETFE copolymer as compared with the properties of a conventional commercially available ethylene-tetrafluoroethylene copolymer (hereinafter referred to as an ETFE resin), it is preferably from 0.01 to 0.2 mol % based on the total of the amounts of E and TFE to be charged. Particularly, the amount of the monomer (A) to be charged is more preferably from 0.03 to 0.1 mol % based on the total of the amounts of E and TFE to be charged.

[Monomer (B)]

An ETFE copolymer usually has, in addition to the tetrafluoroethylene units and the ethylene units, a small amount of another copolymerizable monomer units for the purpose of e.g. improving the stress crack resistance. Accordingly, also for the ETFE copolymer of the present invention, it is preferred to likewise copolymerize a monomer (B) having one copolymerizable double bond.

As such a monomer (B), a fluoroolefin monomer is preferred. The fluoroolefin monomer may, for example, be a (perfluoroalkyl) substituted ethylene or $CH_2$=CF—$(CF_2)_n$—H. Among them, $CH_2$=CH—$C_nF_{2n+1}$ wherein n is an integer of from 4 to 8 (hereinafter referred to also as "monomer (B1)") is preferred, since it is thereby possible to effectively suppress formation of stress cracks, and $CH_2$=CH—$C_4F_9$ (PFBE) is most preferred.

The proportion of units derived from the monomer (B) is preferably from more than 0 mol % to 10 mol %, particularly preferably from 0.1 to 5 mol %, based on the total of TFE units and E units.

In a case where units of the monomer (B) are contained, it is preferred that its copolymerizable double bond is the same as at least one of the copolymerizable double bonds of the monomer (A).

The copolymerizable double bond of the monomer (B) being the same as at least one of the copolymerizable double bonds of the monomer (A) means that the polymerizability of the same double bonds is substantially the same, whereby no deviation is likely to occur in the polymer, such being desirable.

For the same reason, it is more preferred that the monomer (A) is a monomer having two copolymerizable double bonds, and the two copolymerizable double bonds are the same as the copolymerizable double bond of the monomer (B). For the same reason, it is particularly preferred that the monomer (B) is a monomer (B1), and the monomer (A) is $CH_2$=CH—$(CF_2)_n$—CH=$CH_2$ wherein n is an integer of from 4 to 8. Further, it is most preferred that the monomer (B) is a monomer (B1), and the monomer (A) is a monomer (A1).

In a case where the monomer (B) is a monomer (B1), if the charged amount is small (i.e. at most 1 mol % based on the total amount of TFE and E), the units derived from the monomer (B1) in the polymer will also be at the same level as the charged amount. Accordingly, also in a case where the monomer (A) is the above-mentioned $CH_2$=CH—$(CF_2)_n$—CH=$CH_2$ wherein n is an integer of from 4 to 8, if the charged amount is within a preferred range of from 0.01 to 0.2 mol %, it is considered that units derived from the monomer (A) are present in a substantially the same level as the charged amount in the polymer.

The ETFE copolymer of the present invention may be deemed to be one which has been made to be an ETFE resin having the melt tension improved to be suitable for flow molding or inflation molding while maintaining various properties of a conventional ETFE resin.

The molecular weight of the ETFE copolymer in the present invention is preferably within a range where various molding methods may be employed.

In the present invention, as an index corresponding to the molecular weight, the volume flow rate is measured and evaluated. Particularly, the volume flow rate of the ETFE copolymer at 297° C. is preferably from 0.1 to 30 mm$^3$/sec, more preferably from 1 to 20 mm$^3$/sec, as measured by the after-mentioned Koka type flow tester.

[Polymerization Method]

The polymerization method is not particularly limited, and a method such as bulk polymerization, solution polymerization, emulsion polymerization or suspension polymerization may be employed. In the case of the solution polymerization, as the polymerization medium, a hydrofluorocarbon, a chlorofluorocarbon, a hydrochlorofluorocarbon, an alcohol or a hydrocarbon may, for example, be used. In the case of the suspension polymerization, one having water added to a medium such as a hydrofluorocarbon, a chlorofluorocarbon, a hydrochlorofluorocarbon or a hydrocarbon, is used as the polymerization medium. In the case of the emulsion polymerization, water is used as the polymerization medium, but a polymerization medium similar to one used for the solution polymerization may be used in combination.

The polymerization pressure as a polymerization condition is preferably within a range of from 0.01 MPa to 10 MPa, particularly preferably within a range of from 0.1 MPa to 3 MPa. From 0.5 MPa to 3 MPa is particularly preferred as a polymerization condition. Further, the temperature in the polymerization vessel may be adjusted by preliminarily cooling or heating the inside of the polymerization vessel at the time of charging the monomer. The polymerization time is determined depending upon the polymerization temperature. However, the polymerization time as a polymerization condition is in any case, preferably from 30 minutes to 15 hours.

The ETFE copolymer of the present invention is a crystalline thermoplastic fluororesin having a high melt tension without increasing the melt viscosity. Accordingly, even if the parison is pulled downwardly by its own weight during the blow molding, the upper parison will not be stretched, and the wall thickness of such a portion will not become thin, whereby the wall thickness of the molded product will not be non-uniform. Especially when a large sized molded product is formed by blow molding, the wall thickness reduction phenomenon will not result. The "large sized molded product" is not particularly limited, but it may, for example, be a hollow molded product having such a size that the maximum inner diameter is at least 200 mm and less than 1,000 mm. Further, there will be non-uniformity in the thickness of a film to be formed by the inflation molding. Further, the melt viscosity of the resin will not increase during the molding, whereby the moldability of the resin at the time of extruding a parison will not decrease, and the productivity will be improved.

The ETFE copolymer obtained by the present invention has a ratio (X/W) of its melt tension (XmN) to a load (Wkg) applied for the measurement of the melt tension being at least 0.8, as an index for the moldability for the molded product. When "X/W" is at least 0.8, the moldability and the productivity will be excellent at the time of carrying out the blow molding or the inflation molding. "X/W" is not particularly limited and is preferably from 0.8 to 5. When it is at most 5, good moldability can be maintained.

The method for measuring the melt tension will be described later in Examples. The load (W) being large means that the melt viscosity is high. Accordingly, X/W being large means that the melt tension is high even at the same viscosity.

With the above-described properties, the ethylene-tetrafluoroethylene copolymer of the present invention is useful for the production of a bottle, particularly a large sized bottle for storage of a reagent, or a film.

As described above, the ETFE copolymer of the present invention has a high melt tension and thus is excellent in blow moldability and inflation moldability. Further, it has a small melt viscosity and thus is excellent also in the productivity.

EXAMPLES

Now, the present invention will be described in detail with reference to Examples, but it should be understood that the present invention is by no means thereby restricted.

The compositional ratio of tetrafluoroethylene units, ethylene units and perfluorobutylethylene units in the ETFE copolymer was calculated by a fluorine elemental analysis and molten state $^{19}$F-NMR.

Example 1

Into a 1 L pressure vessel equipped with a stirrer, after deaeration, 1,007 g of 1,1,2,2,3-pentafluoro-1,3-dichloropropane (hereinafter referred to as "225cb"), 0.324 g of perfluorohexyl-1,9-diethylene (hereinafter referred to as "the diene"), 190.0 g of tetrafluoroethylene (TFE) and 11.0 g of ethylene (E) were charged at room temperature. Then, the temperature was raised to 66° C., and 1 ml of a 1 wt % solution (solvent: 225cb) of t-butyl peroxypivalate (10-hour half-life temperature: 55° C.) was charged to initiate polymerization. As the polymerization proceeds, the pressure will decrease. Therefore, in order to maintain the pressure to be constant, a mixed gas (TFE/ethylene=54/46 molar ratio) and the diene in a ratio corresponding to 0.04 mol % to the mixed gas, were continuously charged. When the amount of the mixed gas charged became 54 g, the internal temperature was cooled to room temperature, an unreacted gas was discharged, and the pressure vessel was opened. The content in the pressure vessel was washed with 225 cb, subjected to filtration by a glass filter and dried to obtain an ETFE copolymer. The obtained ETFE copolymer was 57 g. The compositional ratio (mol) in the ETFE copolymer was measured, whereby units derived from TFE (hereinafter referred to as TFE units)/units derived from ethylene (hereinafter referred to as E units) was 54.0/46.0.

The volume flow rate, melting point, melt tension, etc. of the copolymer were measured by the methods as described hereinafter. As a result, the above copolymer had a volume flow rate (Q value) of 7.1 (mm$^3$/sec) and a melting point of 272° C. The melt tension, etc. are shown, as summarized, in Table 1.

(Measuring Methods)

Volume flow rate (Q value): Using a Koka type flow tester, the volume of the copolymer flowing out in unit time (mm$^3$/sec) from a nozzle having a diameter of 2.095 mm and a length of 8 mm at 297° C. under a load of 7 kg/cm$^2$ was measured.

Melting point: Using SII DSC6220 model differential scanning calorimeter (manufactured by Seiko Denshi K.K.), the temperature was raised at a rate of 10° C./min, whereby the melting peak was taken as the melting point.

Melt tension (unit: mN): Using Capirograph (manufactured by TOYO SEIKI KOGYO CO, LTD.), a capillary die having a diameter of 1 mm and a length of 10 mm was used at an inflow angle of 90°. The ETFE copolymer was subjected to press molding at 300° C. to prepare a sheet having a thickness of 1 mm, and the sheet was finely cut to a size of about 5 mm square, 5 g of which was introduced into a barrel set at 300° C. Then, a piston was inserted from above and left to stand for 5 minutes until the copolymer melted and the barrel temperature was stabilized at 300° C. Then, the piston was descended at a rate of 5 mm/min, and after waiting until the load applied to the piston became constant and when the load (Wkg) became constant, the take-off speed of a take-off device was adjusted to be 2 m/min, and a strand of the copolymer flowing out from the die was slowly led to the take-off device so that it would not be broken, whereby the strand was withdrawn. The withdrawing strength applied at that time was measured for one minute, and the averaged withdrawing strength was taken as the melt tension (XmN).

Comparative Example 1

Into a 1 L pressure vessel equipped with a stirrer, after deaeration, 683.9 g of perfluoropentyldifluoromethane (hereinafter referred to as "C6H"), 252.9 g of 225 cb, 88.5 g of TFE and 37 g of a mixed gas (TFE/ethylene=54/46 molar ratio) were charged. Then, the temperature was raised to 66° C., and 1 ml of a 1 mass % solution (solvent: C6H) of t-butyl peroxypivarate was charged to initiate polymerization. As the polymerization proceeds, the pressure decreases. Therefore, in order to maintain the pressure to be constant, a mixed gas (TFE/ethylene=54/46 molar ratio) was continuously post-charged. When the amount of the mixed gas post-charged became 50 g, the internal temperature was cooled to room temperature, an unreacted gas was discharged, and the pressure vessel was opened. The content of the pressure vessel was washed with 225cb and subjected to filtration by a glass filter to obtain a copolymer in the form of a slurry. The obtained slurry was vacuum-dried at 60° C. for 12 hours to obtain 58.7 g of a white copolymer.

The volume flow rate, melting point, melt tension, etc. of the copolymer were measured in the same manner as in Example 1, whereby the volume flow rate (Q value) was 13 (mm³/sec), and the melting point was 277° C. The melt tension, etc. are shown, as summarized, in Table 1.

Example 2

Into a 1 L pressure vessel equipped with a stirrer, after deaeration, 374.7 g of C6H, 562.1 g of 225 cb, 0.3 g of the diene, 5.2 g of perfluorobutyl ethylene (hereinafter referred to also as "PFBE"), 89.4 g of TFE and 35 g of a mixed gas (TFE/ethylene=54/46 molar ratio) were charged at room temperature. Then, the temperature was raised to 66° C., and 1 ml of a 1 wt % solution (solvent: 225 cb) of t-butyl peroxypivarate (10-hour half-life temperature: 55° C.) was charged to initiate polymerization. As the polymerization proceeds, the pressure decreases. Therefore, in order to maintain the pressure to be constant, a mixed gas (TFE/ethylene=54/46 molar ratio) and PFBE in a ratio corresponding to 1.4 mol % to the mixed gas and the diene in a ratio corresponding to 0.06 mol %, were continuously charged. When the amount of the mixed gas post-charged became 54 g, the internal temperature was cooled to room temperature, an unreacted gas was discharged, and the pressure vessel was opened. The content of the pressure vessel was washed with 225 cb, subjected to filtration by a glass filter and dried to obtain an ETFE copolymer. The obtained ETFE copolymer was 66.5 g. The compositional ratio (mol) in the ETFE copolymer was measured, whereby TFE units/E units/units derived from perfluorobutyl ethylene (hereinafter referred to as "PFBE units") was 52.0/47.0/1.0.

The volume flow rate, melting point, melt tension, etc. of the copolymer were measured in the same manner as in Example 1. As a result, the ETFE copolymer had a volume flow rate (Q value) of 15 (mm³/sec), and a melting point of 262° C. The melt tension, etc. are shown, as summarized, in Table 1.

Comparative Example 2

Into a 1 L pressure vessel equipped with a stirrer, after deaeration, 683.9 g of C6H, 252.9 g of 225 cb, 88.5 g of TFE, 37 g of a mixed gas (TFE/ethylene=54/46 molar ratio) and 4.92 g of PFBE were charged. Then, the temperature was raised to 66° C., and 1 ml of a 1 mass % solution (solvent: C6H) of t-butyl peroxypivarate was charged to initiate polymerization. As the polymerization proceeds, the pressure decreases. Therefore, in order to maintain the pressure to be constant, a mixed gas (TFE/ethylene=54/46 molar ratio) and PFBE in a ratio corresponding to 1.4 mol % to the mixed gas, were continuously charged. When the amount of the mixed gas post-charged became 50 g, the internal temperature was cooled to room temperature, an unreacted gas was discharged, and the pressure vessel was opened. The content of the pressure vessel was washed with 225 cb and subjected to filtration by a glass filter to obtain a copolymer in the form of a slurry. The obtained slurry was vacuum-dried at 60° C. for 12 hours to obtain 62.0 g of a white copolymer. The volume flow rate, melting point, melt tension, etc. of the copolymer were measured in the same manner as in Example 1, whereby the volume flow rate (Q value) was 10 (mm³/sec), and the melting point was 260° C. The melt tension, etc. are shown, as summarized, in Table 1.

Example 3

Into a 1 L pressure vessel equipped with a stirrer, after deaeration, 936.8 g of 225 cb, 0.5 g of the diene, 5.2 g of PFBE, 89.4 g of TFE and 35 g of a mixed gas (TFE/ethylene=54/46 molar ratio) were charged at room temperature. Then, the temperature was raised to 66° C., and 1 ml of a 1 wt % solution (solvent: 225 cb) of t-butyl peroxypivarate (10-hour half-life temperature: 55° C.) was charged to initiate polymerization. As the polymerization proceeds, the pressure decreases. Therefore, in order to maintain the pressure to be constant, a mixed gas (TFE/ethylene=54/46 molar ratio) and PFBE in a ratio corresponding to 1.4 mol % to the mixed gas, and the diene in a ratio corresponding to 0.1 mol %, were continuously charged. When the amount of the mixed gas post-charged became 60 g, the internal temperature was cooled to room temperature, an unreacted gas was discharged, and the pressure vessel was opened. The content of the pressure vessel was washed with 225 cb, subjected to filtration by a glass filter and dried to obtain an ETFE copolymer. The obtained ETFE copolymer was 61.5 g. The compositional ratio (mol) in the ETFE copolymer was measured, whereby TFE units/E units/PFBE units was 52.2/46.8/1.0.

The volume flow rate, melting point, melt tension, etc. of the ETFE copolymer were measured in the same manner as in Example 1. As a result, the ETFE copolymer had a volume flow rate (Q value) of 13 (mm³/sec) and a melting point of 256° C. The melt tension, etc. are shown, as summarized, in Table 1.

TABLE 1

| Sample | Temperature (°C.) | Piston speed [mm/min] | Load [kg] | Take-off speed [m/min] | Melt tension Maximum [mN] | Melt tension Minimum [mN] | Melt tension Average [mN] | (X/W) (average melt tension/load) [mN/kg] |
|---|---|---|---|---|---|---|---|---|
| Ex. 1 | 300 | 5 | 35.2 | 2 | 36.3 | 35.7 | 36.0 | 1.0 |
| Comp. Ex. 1 | 300 | 5 | 23.6 | 2 | 10.5 | 10.0 | 10.3 | 0.4 |
| Ex. 2 | 300 | 5 | 25.5 | 2 | 22.1 | 21.5 | 21.8 | 0.9 |
| Comp. Ex. 2 | 300 | 5 | 23.6 | 2 | 8.0 | 7.4 | 7.7 | 0.3 |
| Ex. 3 | 300 | 5 | 21.2 | 2 | 45.2 | 43.7 | 44.4 | 2.1 |

From Example 1 and Comparative Example 1, it was found that by the addition of the diene, X/W was improved.

Further, also in the PFBE copolymer system (Examples 2 and 3 and Comparative Example 2), it was found that by the addition of the diene, X/W was more improved.

INDUSTRIAL APPLICABILITY

The ETFE copolymer of the present invention is a thermoplastic fluororesin having a high melt tension and excellent moldability and thus is useful as a resin for bottles or films to be obtained by using blow molding or inflation molding.

The entire disclosures of Japanese Patent Application No. 2008-022971 filed on Feb. 1, 2008 and Japanese Patent Application No. 2008-322588 filed on Dec. 18, 2008 including specifications, claims and summaries are incorporated herein by reference in their entireties.

What is claimed is:

1. An ethylene-tetrafluoroethylene copolymer which consists essentially of ethylene units, tetrafluoroethylene units, units of a monomer (A) having at least two copolymerizable double bonds, and optionally units of a monomer (B) having one copolymerizable double bond,
wherein
monomer (A) is a monomer represented by the following formula:

wherein $R^f$ is a polyfluoroalkylene group, and each of Y and Z which are independent of each other, is a vinyl group, a trifluorovinyl group or a trifluorovinyloxy group,
monomer (B) is $CH_2=CH-C_nF_{2n+1}$ wherein n is an integer of from 4 to 8,
the proportion of the tetrafluoroethylene units is from 30 to 70 mol % and the proportion of the ethylene units is from 70 to 30 mol %, based on the total of the tetrafluoroethylene units and the ethylene units,
the proportion of units of the monomer (A) is 0.01 to 0.2 mol % based on the total of the tetrafluoroethylene units and the ethylene units to be charged for polymerization,
the proportion of units of the monomer (B), when present, is from more than 0 mol % to 10 mol %, based on the total of the tetrafluoroethylene units and the ethylene units,
and wherein the copolymer has a ratio (X/W) of its melt tension (XmN) to a load (Wkg) applied for the measurement of the melt tension being at least 0.8.

2. The ethylene-tetrafluoroethylene copolymer according to claim 1, wherein the proportion of the tetrafluoroethylene units is from 40 to 60 mol % and the proportion of the ethylene units is from 60 to 40 mol %, based on the total of the tetrafluoroethylene units and the ethylene units.

3. The ethylene-tetrafluoroethylene copolymer according to claim 1, where monomer (B) is present.

4. The ethylene-tetrafluoroethylene copolymer according to claim 3, wherein n is 4.

5. The ethylene-tetrafluoroethylene copolymer according to claim 3, wherein the proportion of units of the monomer (B) is 0.1 to 5 mol %, based on the total of the tetrafluoroethylene units and the ethylene units.

6. The ethylene-tetrafluoroethylene copolymer according to claim 1, wherein the monomer (A) is a monomer represented by the following formula:

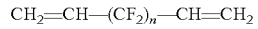

wherein n is an integer of from 4 to 8.

7. The ethylene-tetrafluoroethylene copolymer according to claim 6, which consists of said ethylene units, said tetrafluoroethylene units, and said units of monomer (A).

8. The ethylene-tetrafluoroethylene copolymer according to claim 7, wherein the proportion of units of the monomer (A) is 0.03 to 0.1 mol % based on the total of the tetrafluoroethylene units and the ethylene units to be charged for polymerization.

9. The ethylene-tetrafluoroethylene copolymer according to claim 6, which consists of said ethylene units, said tetrafluoroethylene units, said units of monomer (A), and said units of monomer (B).

10. The ethylene-tetrafluoroethylene copolymer according to claim 9, wherein the proportion of units of the monomer (A) is 0.03 to 0.1 mol % based on the total of the tetrafluoroethylene units and the ethylene units to be charged for polymerization.

11. The ethylene-tetrafluoroethylene copolymer according to claim 6, wherein the proportion of units of the monomer (A) is 0.03 to 0.1 mol % based on the total of the tetrafluoroethylene units and the ethylene units to be charged for polymerization.

12. The ethylene-tetrafluoroethylene copolymer according to claim 1, wherein the ratio (X/W) is from 0.8 to 5.

13. The ethylene-tetrafluoroethylene copolymer according to claim 1, wherein Y and Z are the same.

14. The ethylene-tetrafluoroethylene copolymer according to claim 13, wherein Y and Z are both vinyl groups or trifluorovinyl groups.

15. The ethylene-tetrafluoroethylene copolymer according to claim 1, wherein the proportion of units of the monomer (A) is 0.03 to 0.1 mol % based on the total of the tetrafluoroethylene units and the ethylene units to be charged for polymerization.

16. The ethylene-tetrafluoroethylene copolymer according to claim 1, where monomer (B) is not present.

17. The ethylene-tetrafluoroethylene copolymer according to claim 1, which consists of said ethylene units, said tetrafluoroethylene units, and said units of monomer (A).

18. The ethylene-tetrafluoroethylene copolymer according to claim 1, which consists of said ethylene units, said tetrafluoroethylene units, said units of monomer (A), and said units of monomer (B).

* * * * *